United States Patent

Tomisawa

[15] 3,700,783

[45] Oct. 24, 1972

[54] VIBRATO EFFECT PRODUCING APPARATUS USING A PLURALITY OF REPRODUCING HEADS WHICH ARE INDIVIDUALLY RECIPROCALLY DISPLACED RELATIVE TO EACH OTHER

[72] Inventor: Norio Tomisawa, Hamamatsu, Japan

[73] Assignee: Nippon Gakki Seizo Kabushiki Kaisha, Shizuoka-ken, Japan

[22] Filed: Nov. 4, 1970

[21] Appl. No.: 86,823

[30] Foreign Application Priority Data

| | | |
|---|---|---|
| Nov. 8, 1969 | Japan | 44/106291 |
| Nov. 8, 1969 | Japan | 44/106292 |
| Nov. 8, 1969 | Japan | 44/106293 |
| Nov. 8, 1969 | Japan | 44/106294 |
| Dec. 19, 1969 | Japan | 44/120913 |
| Jan. 29, 1970 | Japan | 45/9093 |
| Jan. 29, 1970 | Japan | 45/9094 |
| Jan. 29, 1970 | Japan | 45/9095 |

[52] U.S. Cl. ....................... 84/1.25, 179/100.2 RE

[51] Int. Cl. ....................... G10h 1/04, G11b 21/02

[58] Field of Search .............. 179/100.2 RE; 84/1.25

[56] References Cited

UNITED STATES PATENTS

| | | | |
|---|---|---|---|
| 2,512,015 | 6/1950 | Graveel | 84/1.25 |
| 3,484,563 | 12/1969 | Tak | 179/100.2 RE |
| 2,982,821 | 5/1961 | Kleis et al. | 179/100.2 RE |
| 3,154,644 | 10/1964 | Tak | 179/100.2 RE |
| 2,843,676 | 7/1958 | Halliday | 179/100.2 RE |

*Primary Examiner*—James W. Moffitt
*Assistant Examiner*—Robert S. Tupper
*Attorney*—Cushman, Darby & Cushman

[57] ABSTRACT

A vibrato effect producing apparatus using at least one recording head and a plurality of reproducing heads and at least a magnetic tape having at least one recording track and a tape drive means. The apparatus is provided with means for producing periodical variations to relative motions between said tape and said recording head and between the former and the reproducing heads whereby various frequency modulated tone signals may be derived at the respective reproducing heads simultaneously. These tone signals imparted with different frequency modulations are mixed to provide music sounds having rich frequency spectra.

10 Claims, 24 Drawing Figures

Norio Tomisawa
INVENTOR.

BY

Cushman, Darby & Cushman
ATTORNEYS

Norio Tomisawa
INVENTOR

BY
Cushman, Darby & Cushman
ATTORNEYS

Norio Tomisawa
INVENTOR.

BY

Cushman, Darby & Cushman

ATTORNEYS

Norio Tomisawa
INVENTOR

BY

Cushman, Darby & Cushman
ATTORNEYS

Norio Tomisawa
INVENTOR

BY
Cushman, Darby & Cushman
ATTORNEYS

Norio Tomisawa
INVENTOR

BY

Cushman, Darby & Cushman
ATTORNEYS

Norio Tomisawa
INVENTOR

BY

Cushman, Darby & Cushman
ATTORNEYS

Norio Tomisawa
INVENTOR

BY
Cushman, Darby & Cushman
ATTORNEYS

Norio Tomisawa
INVENTOR

BY

Cushman, Darby & Cushman
ATTORNEYS

Norio Tomisawa
INVENTOR

BY
Cushman, Darby & Cushman
ATTORNEYS

Norio Tomisawa
INVENTOR

BY

Cushman, Darby & Cushman
ATTORNEYS

Norio Tomisawa
INVENTOR

BY

Cushman, Darby & Cushman
ATTORNEYS

VIBRATO EFFECT PRODUCING APPARATUS USING A PLURALITY OF REPRODUCING HEADS WHICH ARE INDIVIDUALLY RECIPROCALLY DISPLACED RELATIVE TO EACH OTHER

BACKGROUND OF THE INVENTION

1. Field of the Invention

The present invention relates to a vibrato effect producing apparatus, and more particularly to apparatus for vibrato effects to electrical tone signals generated in an electronic or electrical musical instrument, using combined recording and reproducing heads through a tape.

2. Description of the Prior Art

In order to provide emotional depth and warmness of tones generated from an electronic musical instrument, there has heretofore been used an oscillator constituting a tone source circuit of the instrument, which is capable of providing vibrato effects be subjecting the generated tone signals to frequency modulation. However, such an oscillator is disadvantageous in that it has low frequency stability and its construction is much complicated and too expensive to manufacture. In view of this fact, an attempt has recently been proposed to provide a new vibrato effect producing device in which a tone signal is frequency modulated by using a recording tape, a recording head, a reproducing head and means for providing instantaneous periodical deviation to at least one of said tape, said recording head and said reproducing head. The device, however, is not yet satisfactory to provide varieties of vibrato effects concurrently as required in music being played, for its simplicity. Therefore, further improvements have been desired to overcome the drawbacks.

SUMMARY OF THE INVENTION

It is, therefore, an object of the present invention to provide an improved vibrato effect producing apparatus capable of providing various specific sound effects concurrently by electrically processing input tone signals to produce fluctuation therein.

Another object of the present invention is to provide a vibrato effect producing apparatus having an improved structure using a plurality of magnetic recording and reproducing means.

A further object of the present invention is to provide a vibrato effect producing apparatus which enables stable frequency modulation to input tone signals with its relatively simple construction.

A still further object of the present invention is to provide a vibrato effect producing apparatus usable with tone sources in combination.

According to the present invention, there is provided a vibrato effect producing apparatus comprising in combination means for entering an input tone signal to the apparatus, at least one magnetic recording medium such as a magnetic tape having one or more recording tracks, a drive mechanism for transportating the tape, at least one tone signal recording head contactable with said tape, a plurality of reproducing heads for picking up and reproducing tone signals recorded on the tape, means instantaneously actuating at least one of said tape, said recording head and said reproducing heads at different periods, phases or strokes to produce periodical deviation between said tape and recording head and reproducing heads, and output means for deriving a plurality of frequency modulated tone signals from the reproducing heads.

Other objects, features and advantages of the present invention will become apparent from the following detailed description taken in conjunction with the accompanying drawings.

DESCRIPTION OF THE PREFERRED EMBODIMENTS

Figure 1:
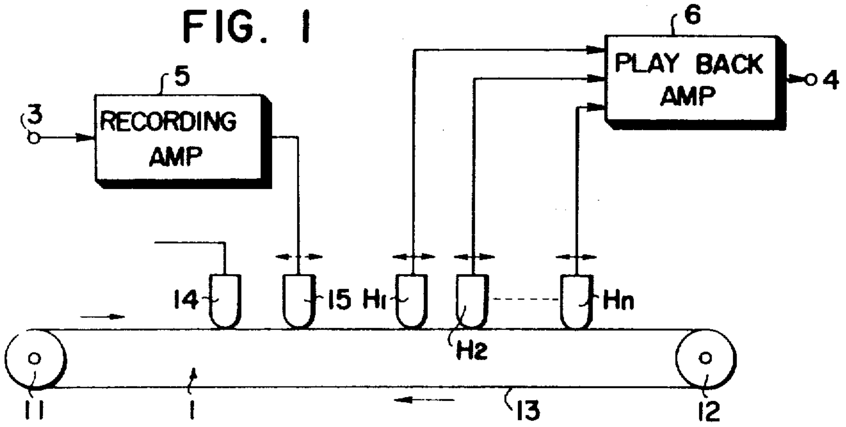
FIG. 1 is a schematic diagram of a vibrato effect producing apparatus showing an embodiment of the invention.

Hereunder, like reference numerals and symbols indicate like parts in the drawings.

Figure 2A:
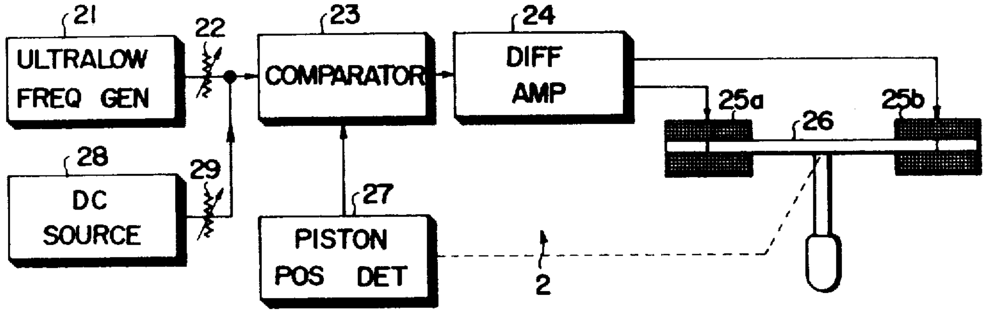
FIG. 2*a* is a schematic diagram of a drive mechanism for instantaneously producing a displacement of a recording head, reproducing heads or a magnetic tape

Generally, a vibrato effect producing apparatus according to the present invention may be considered to be constituted principally be a recording and reproducing mechanism 1 as shown in FIG. 1, and a drive mechanism 2 for causing a displacement or a deviation in a recording head or reproducing heads as shown in FIG. 2*a*.

Figure 2D:
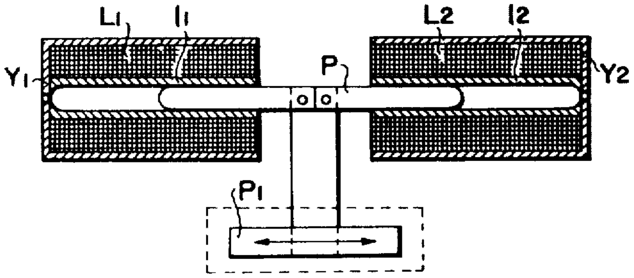
FIG. 2*d* is a view of a drive assembly shown in FIG. 2*a*.
Figure 2B:
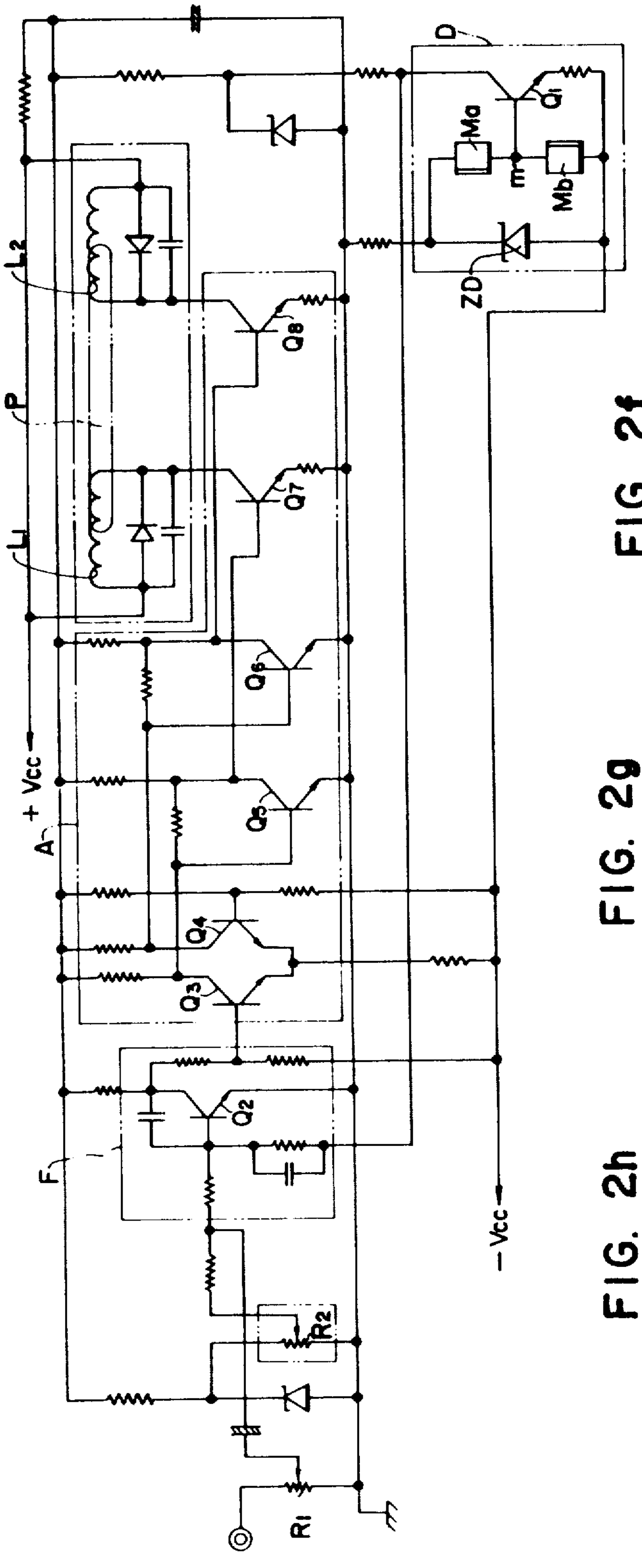
FIGS. 2*b* and 2*c* are schematic circuit diagrams showing the details of FIGS. 2*a* and 2*b*, respectively.
Figure 2E:
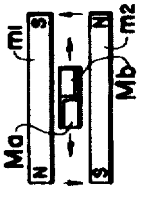
FIG. 2*e* is a view of an example of a piston detecting means shown in FIG. 2*b*, and FIGS. 2*f* to 2*h* are charts for explaining the operation of the circuit arrangements shown in FIGS. 2*a*, 2*b* and 2*e*.
Figure 2F:
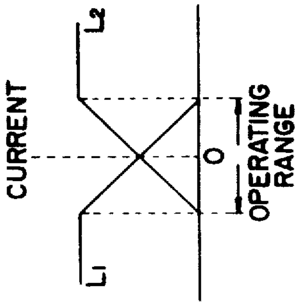
Figure 2G:
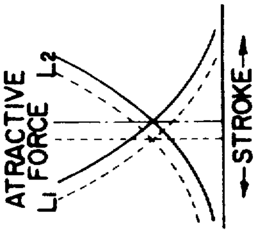
Figure 2H:
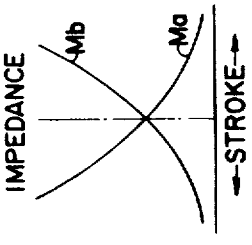
Figure 2C:
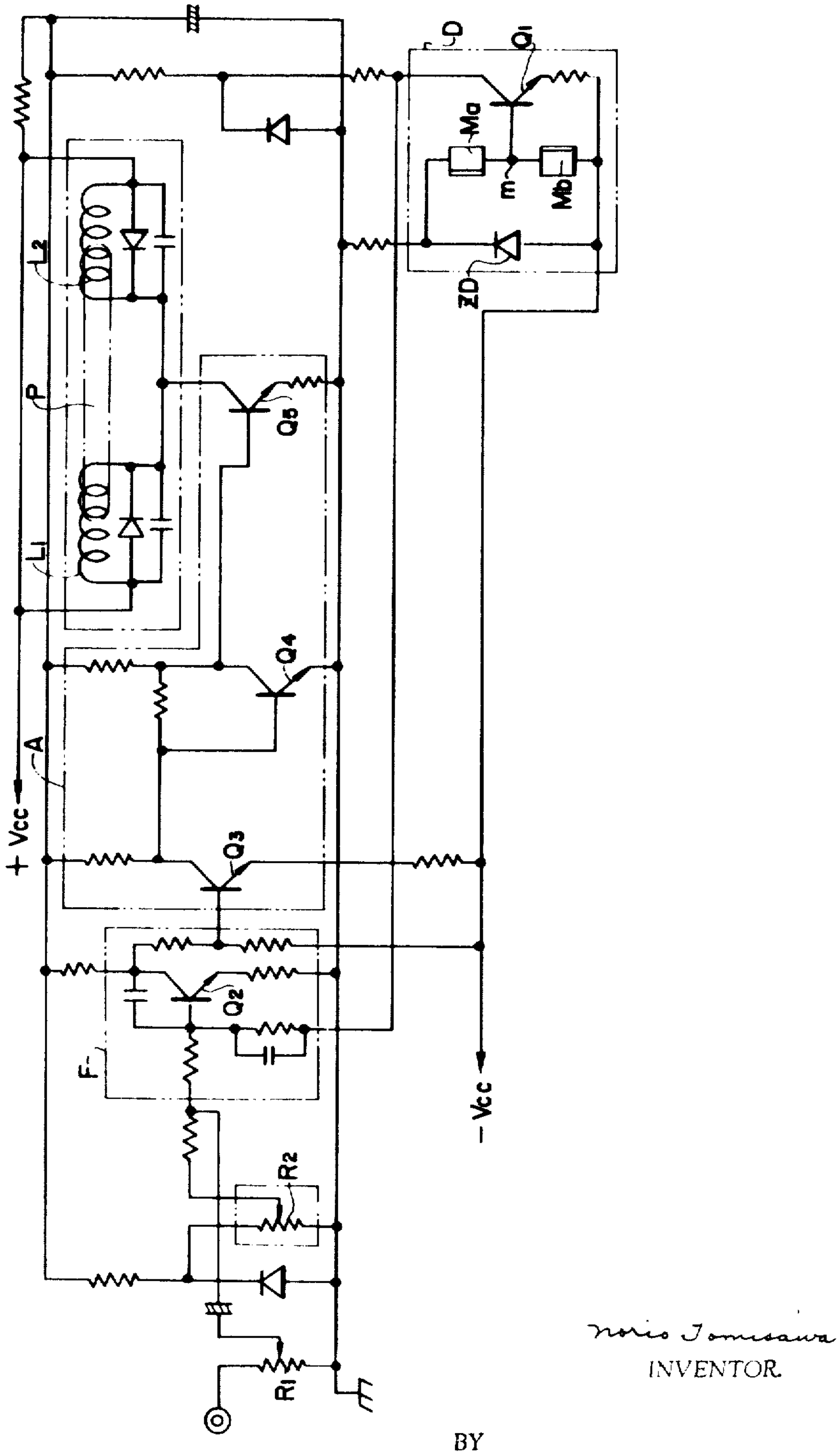
Figure 3C:
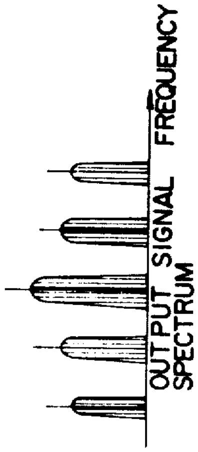
FIGS. 3*a* through 3*c* are charts for explaining the operation of the present apparatus.

Referring to FIGS. 1 to 3, the recording and reproducing mechanism 1 is arranged to be directly or selectively connected by the operator between an input terminal 3 connected to the whole preceding circuitry as a music signal source (not shown) including tone generators, keyboard circuits and tone coloring circuits, or to a common output terminal of integrated tone generator groups (not shown), and an output terminal 4 connected to the succeeding stage including an amplifier and an electro-acoustic transducer for converting electrical signals into audible sounds.

The recording and reproducing mechanism 1 includes a plurality of driving drum 11 and 12 which can rotate at a constant speed through a known rotating means by a driving mechanism (not shown), at least one endless magnetic tape 13 carried on the drums, which may be replaced by a magazine type or a magnetic disk, an erasing head 14, a recording head 15, and a plurality of reproducing heads $H_1, H_2 \ldots\ldots H_n$. The recording head or the reproducing heads are disposed to reciprocally be displaced in the parallel direction with that of recording medium transportation such as magnetic tape transportation.

As shown in the drawings, a recording amplifier 5 and a playback and mixing amplifier 6 may be provided respectively between the recording head 15 and the input terminal 3 and between the reproducing heads $H_1, H_2 \ldots\ldots H_n$ and the output terminal 4.

A drive mechanism 2 serves to displace the recording head and/or said plurality of reproducing heads reciprocally in the direction parallel to that of the tape transportation. As shown in FIG. 2*a*, the drive mechanism 2 is so constructed that an output signal of an ultralow frequency generator 21 in the order of 0.5 to 10 Hz is applied subsequently through a variable attenuator 22 and a voltage comparator 23 to the input side of a differential amplifier 24 of a push-pull type, and then two signals derived from the output side of the amplifier 24 — which are opposite in phase to each other — are supplied to plunger coils 25*a* and 25*b*, respectively. The plunger coil assembly 25 is disposed at an appropriate distance from the mechanism 1. Thus, a magnetic force induced alternately from two coils causes a piston 26 — formed of magnetic material and loosely engaged into the coils — to be moved linearly and reciprocally. Further, in order to improve the linearity of the piston motion and to restore the displaced piston to the initial position, there is provided a piston position detecting device 27 between said piston 26 and said comparator circuit 23 to automatically control the operation of the differential amplifier 24, and there is connected a DC source 28 through a variable resistor or attenuator 29 to one input of the comparator circuit 23 for effecting a fine adjustment of the center point of the piston within a certain range by varying the DC level of the comparator circuit 23. The piston 26 is coupled to the reproducing head 16 or the recording head 15 by the use of an appropriate means and is caused to displace linearly in a direction parallel to that of the running medium such as the magnetic tape 13.

Now, the operation of the apparatus as set forth above will be explained.

Assuming that the the travelling velocity or running speed of the recording medium such as the magnetic tape is $v$ millimeters per second, and that the range or amplitude of a sinusoidal displacement of the recording head or the reproducing heads driven by the drive mechanism 2 is $\pm x$ millimeters, the variations in the relative velocity between the magnetic tape and the head being driven, i.e., the maximum velocity $\dot{x}$ may be expressed by:

$$\dot{x} = 2\pi p x \text{ (millimeters per second)}$$

wherein $p$ represents the displacement frequency (Hz) of the head.

Therefore, the variation rate of the velocity may be expressed by:

$$\dot{x}/v = 2\pi p x/v$$

From the above relation, when the reproducing heads $H_1, H_2 \ldots\ldots H_n$ or the recording head 15 is displaced at a displacement frequency of 0.5 Hz with a displacement range of 1 millimeter utilizing the ultra-low frequency signal generator 21, the variation in velocity becomes ±0.83 percent, wherein $v$ is assumed 380 millimeters per second.

Accordingly, when the oscillation frequency of the tone generator is 1,500 Hz, an input signal of such a frequency is subjected to a frequency deviation of ±8.3 Hz, and hence, the output waveform which may be derived at the output terminal 4 becomes a frequency modulated one.

As a result, when either of the heads is rendered to be reciprocally displaced at a relatively low frequency, e.g., 0.5 to 2 Hz by the use of the ultra-low frequency signal generator 21, the sound resulting from the head provides a celesta effect or a chorus effect, while if the head is arranged so as to be reciprocally displaced at a relatively high frequency, e.g., 5 to 8 Hz, the sound will provide a good vibrato effect.

Therefore, by arranging the apparatus so that the operator may change the oscillation frequency of the ultra-low frequency signal generator in the range of 0.5 up to 10 Hz continuously or selectively, the operator may cause the playing sound to provide the above-mentioned effects such as chorus or vibrato at will.

Figure 3A:
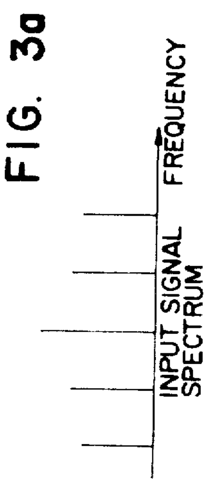
Figure 3B:
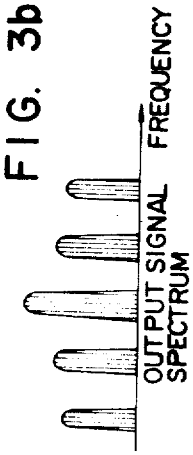

As is seen from the foregoing description, if the variation in the relative speed between either of the recording head and said plurality of reproducing heads and the speed of the travelling recording medium is varied by a displacement of either of the heads, the spectrum of an output signal corresponding to that of an input signal as shown by a line spectrum in FIG. 3*a* becomes a distributed one of FIG. 3*b*, resulting in the same effects as described above. The vibrato effect producing apparatus may be used in electric musical instruments such as guitar and also in electronic musical instruments such as electric organs.

Accordingly, when the whole or groups of a multiplicity of the reproducing heads $H_1, H_2 \ldots\ldots H_n$ are driven by a plurality of drive mechanisms 2 at the rate of their reciprocal displacement frequencies, (or phases), for example, $1 : \sqrt{2}$ or $1 : \sqrt{2} : \sqrt{3}$, the spectrum of an output signal derived from the reproducing heads through the mixing amplifier 6 may have complexities and varieties much than that of FIG. 3*b* to provide various useful effects to music being played.

Figure 4B:
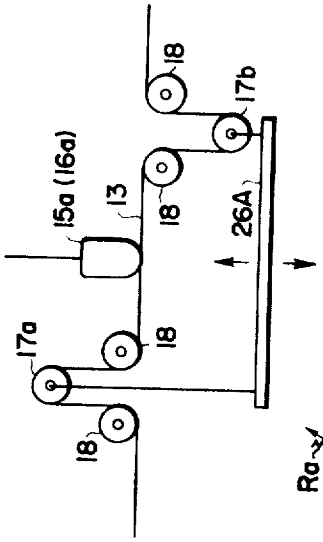
FIGS. 4*a* and 4*b* are views of the apparatus showing another embodiment of the invention, the latter being partially illustrated.
Figure 4A:
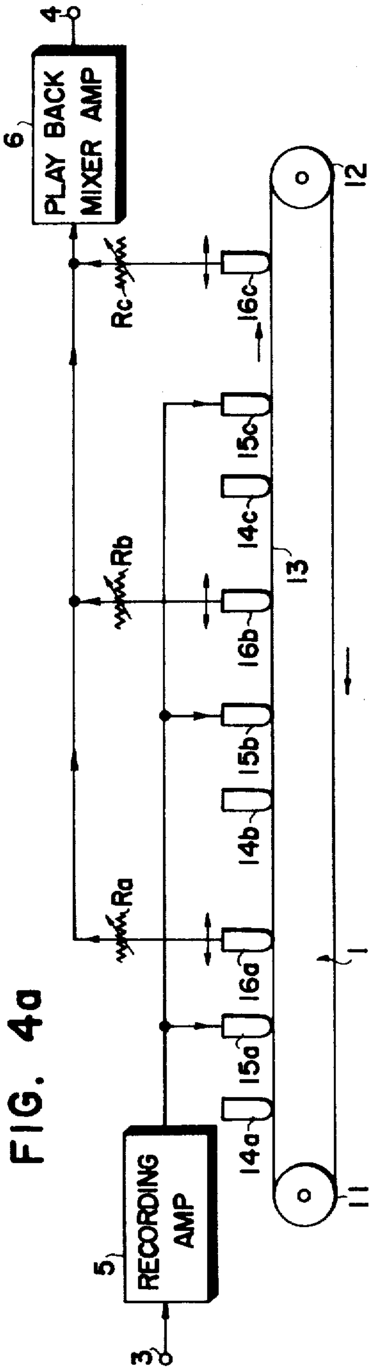

Referring to FIGS. 4*a* and 4*b*, there is shown another embodiment of the present apparatus, in which there are provided a plurality of erasing heads 14*a*, 14*b* and 14*c*, a plurality of recording heads 15*a*, 15*b* and 15*c* and a plurality of reproducing heads 16*a*, 16*b* and 16*c* corresponding to the respective recording heads on a recording medium 13, the output of each reproducing head being adapted to be introduced through an individual attenuating resistor into a playback mixing amplifier 6, while the input of each recording head being obtained from a common recording amplifier 5. The arrangement enables complex frequency modulation to an input signal.

FIG. 4*b* shows an example in which a part of the travelling recording medium 13 is displaced instantaneously in the reverse direction of the medium transportation in place of the instantaneous displacement of the heads as stated above. Numerals 18 denotes pairs of rolls mounted on a base with a required distance to each other for guiding the tape 13. Numerals 17*a* and 17*b* denote a pair of slidable guide rolls which are mounted on a member 26A connected with the drive mechanism 2 so as to instantaneously displace with the motion of the member 26A. On the member 26A is mounted a piston 26 by an appropriate means to thereby actuate the member 26A. The instantaneous displacement of the member 26A causes the speed of the tape 13 — travelling on the path between rolls 18 via the guide rolls 17*a* and 17*b* — to be varied.

Figure 5:
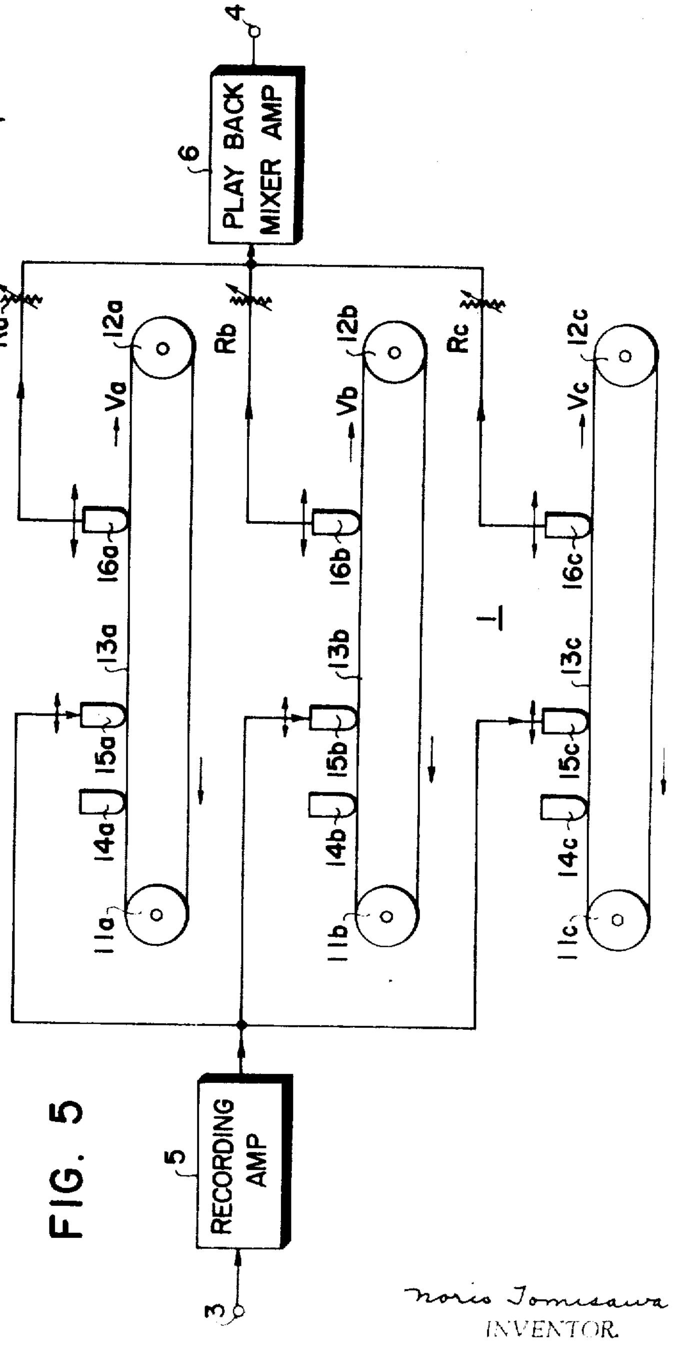
FIG. 5 is a view of the apparatus showing a further embodiment of the invention.

Referring to FIG. 5, there is shown a further embodiment of the present apparatus, in which there are connected between a common recording amplifier 5 and a common playback mixer amplifier 6 a plurality of grouped recording and reproducing mechanisms, each group comprising a running tape, a recording head and a reproducing head, instantaneous head or tape drive means, an erasing head and an output adjusting attenuator. The apparatus is of course applicable to the device of FIG. 4*b*.

Figure 6:
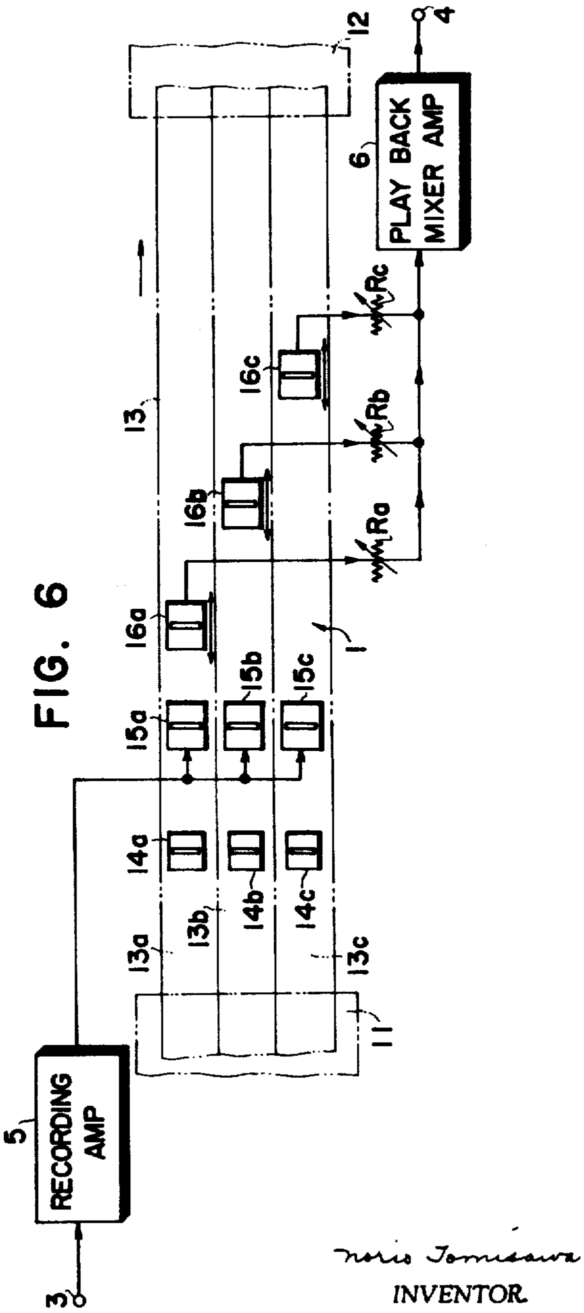
FIG. 6 is a view of the apparatus of a still further embodiment of the invention.
Figure 7B:
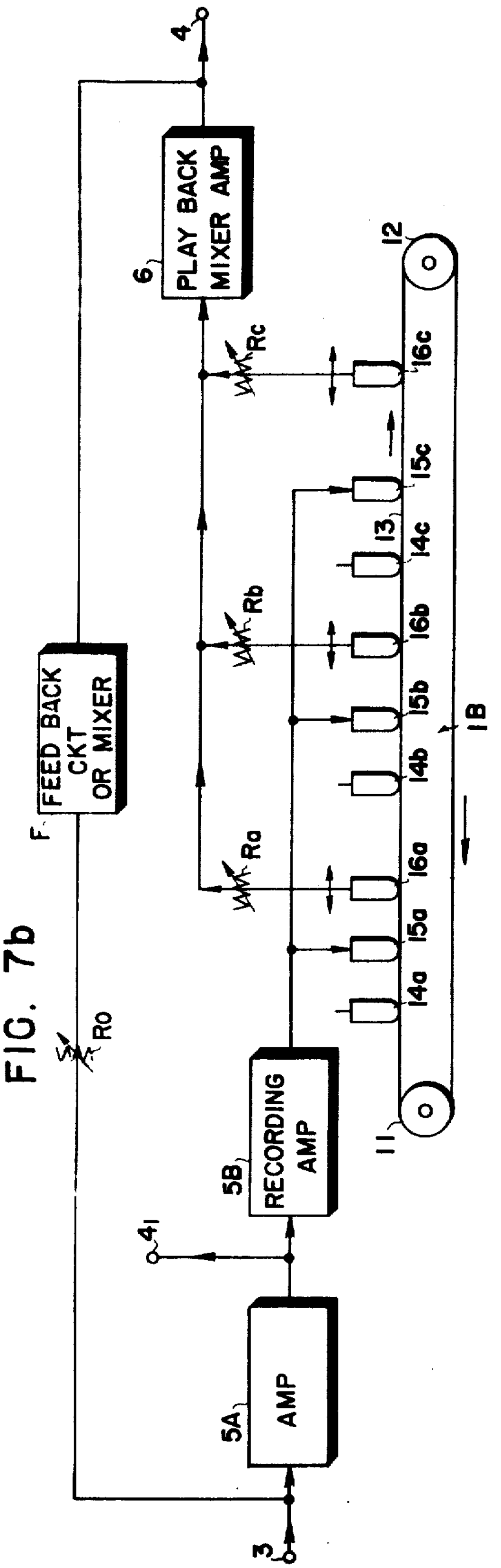
FIGS. 7*a* to 7*d* are views of modifications of embodiments shown in FIGS. 1, 4*a*, 6 and 5, respectively.
Figure 7A:
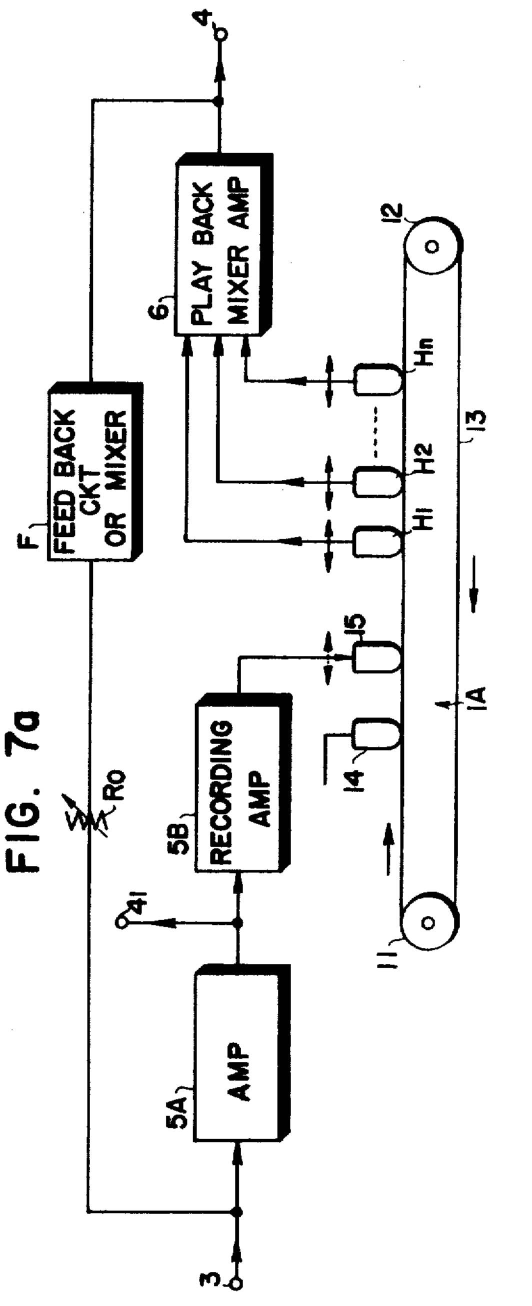
Figure 7C:
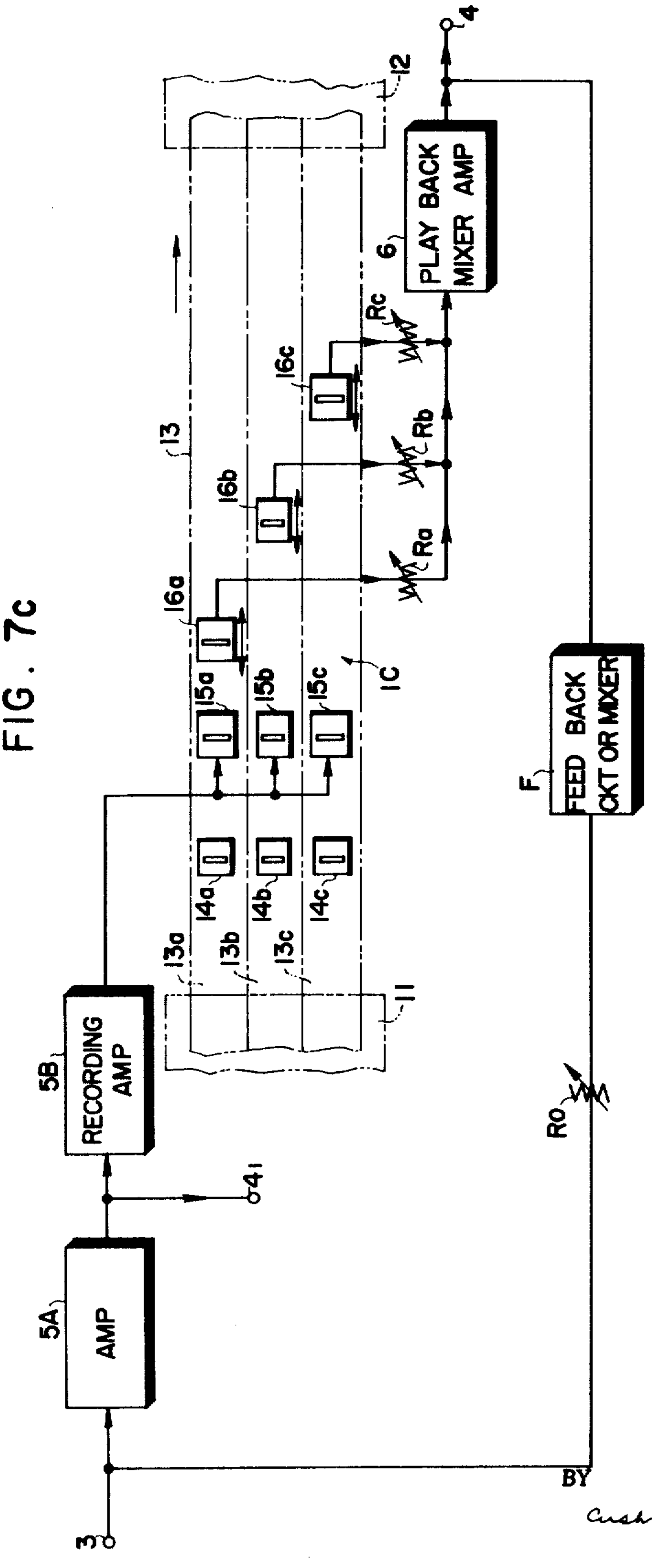
Figure 7D:
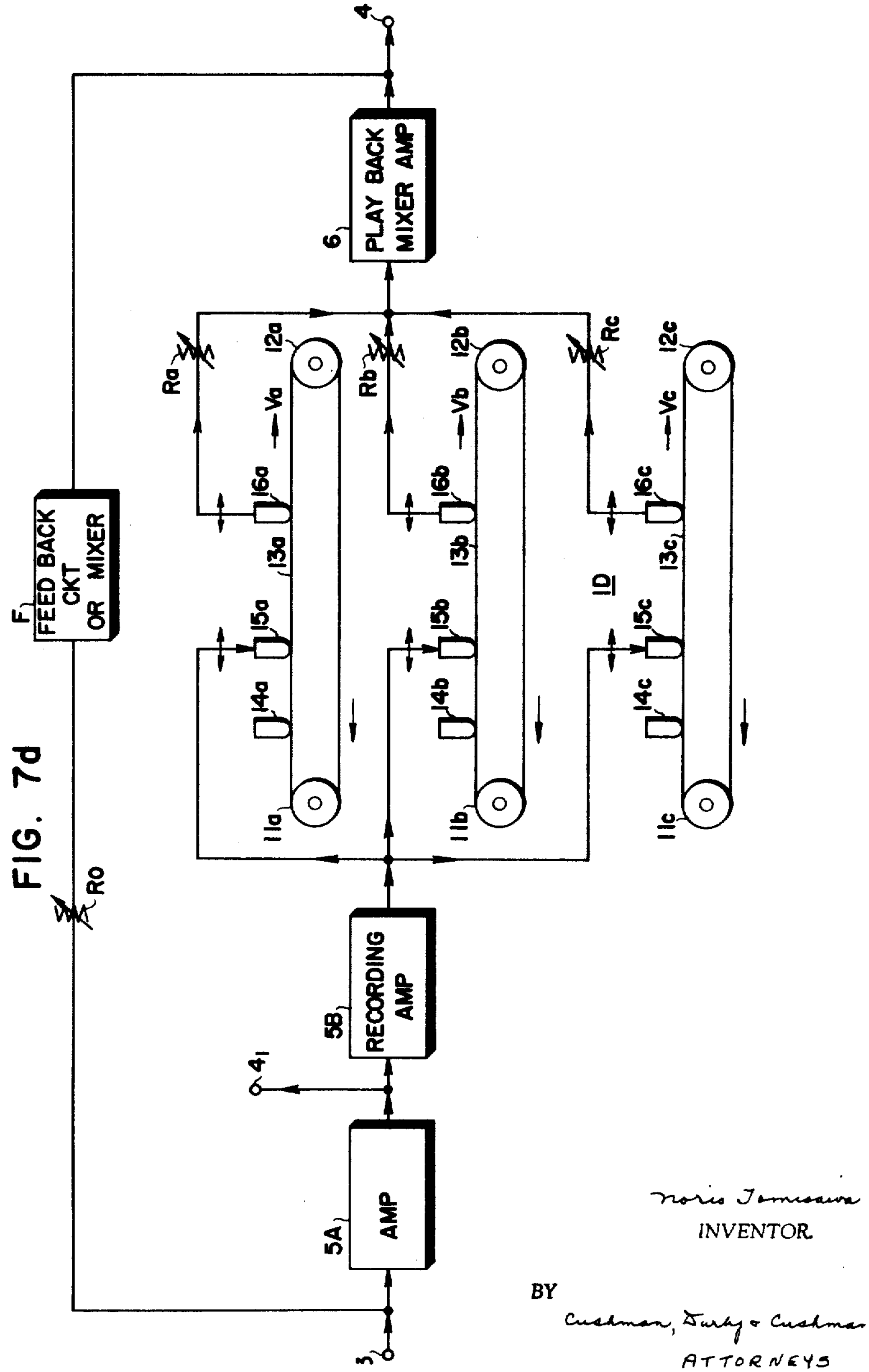
Figure 8A:
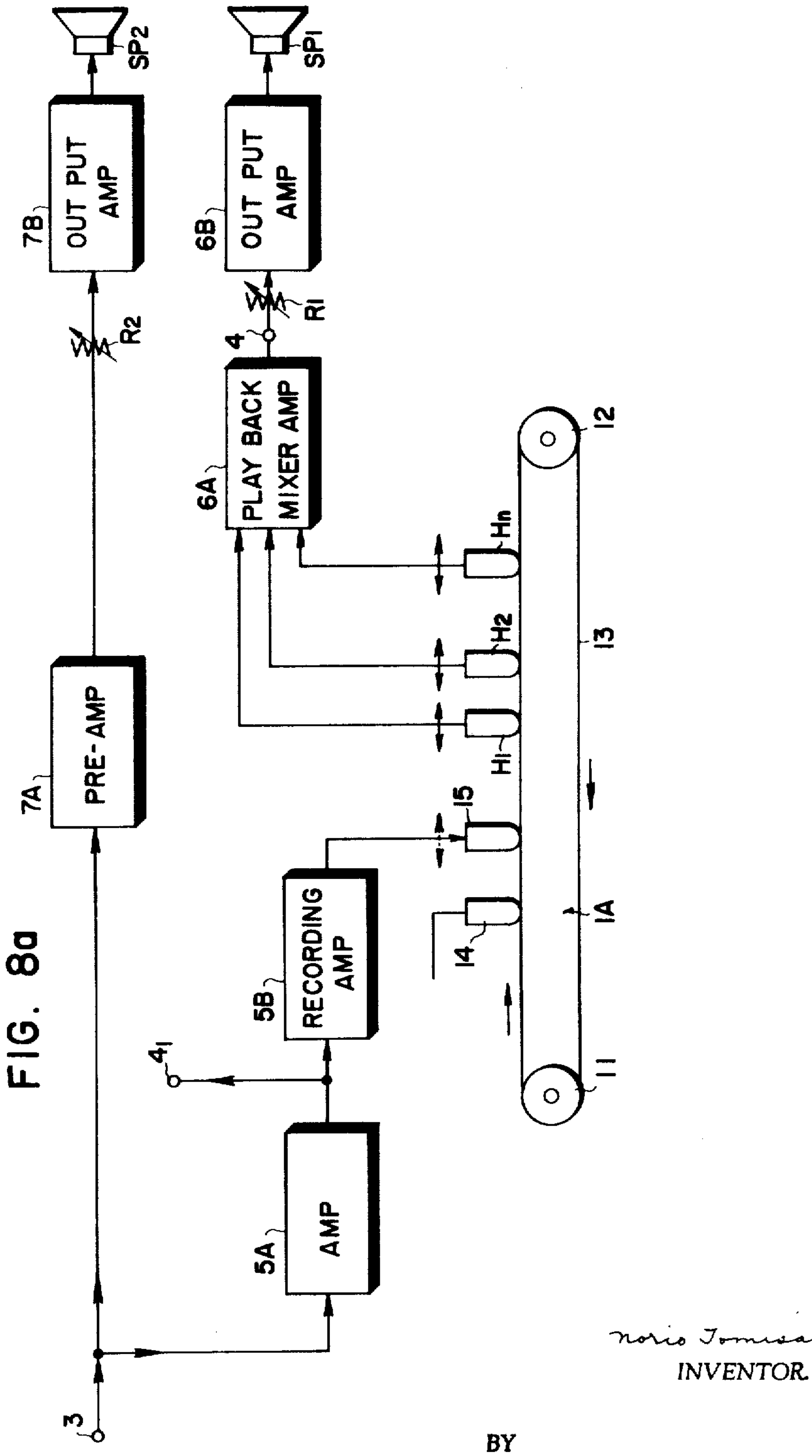
FIGS. 8*a* to 8*d* are views of further modifications of embodiments shown in FIGS. 1, 4*a*, 6 and 5, respectively.
Figure 8D:
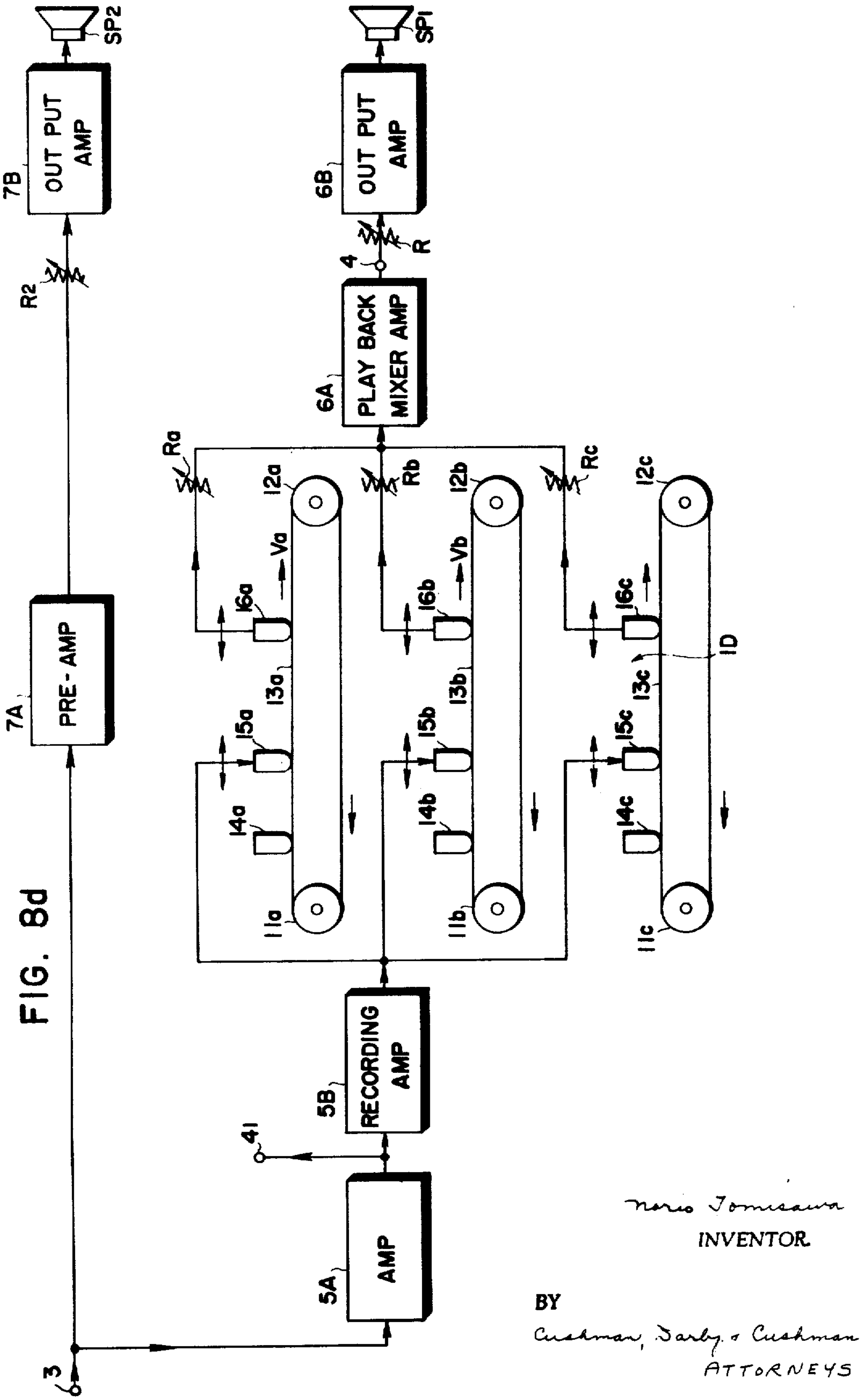
Figure 8B:
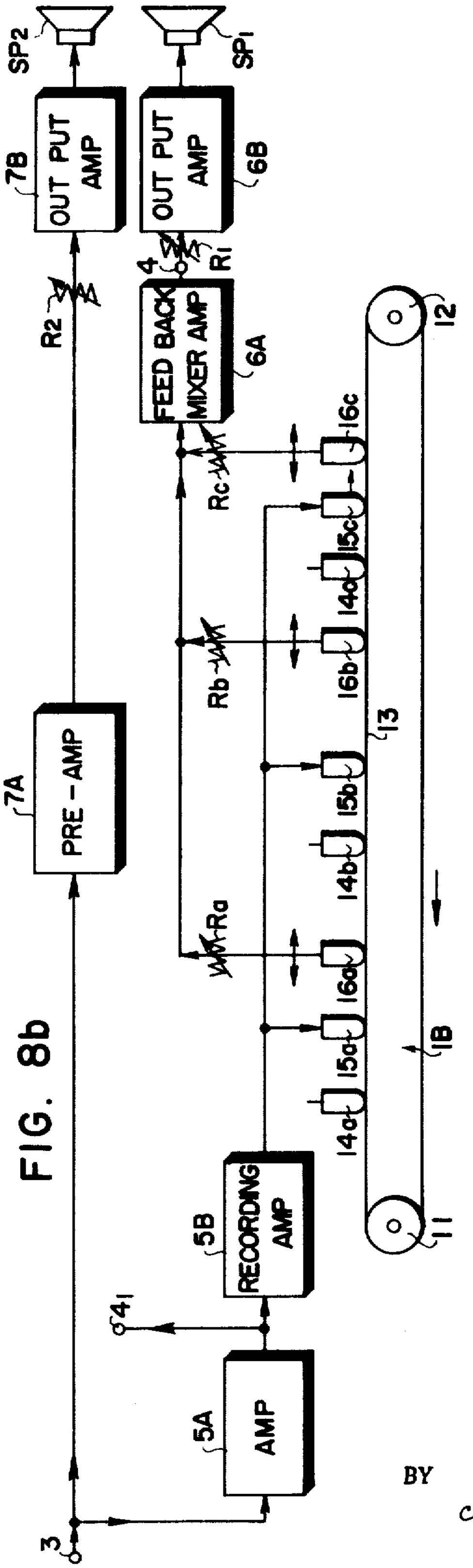
Figure 8C:
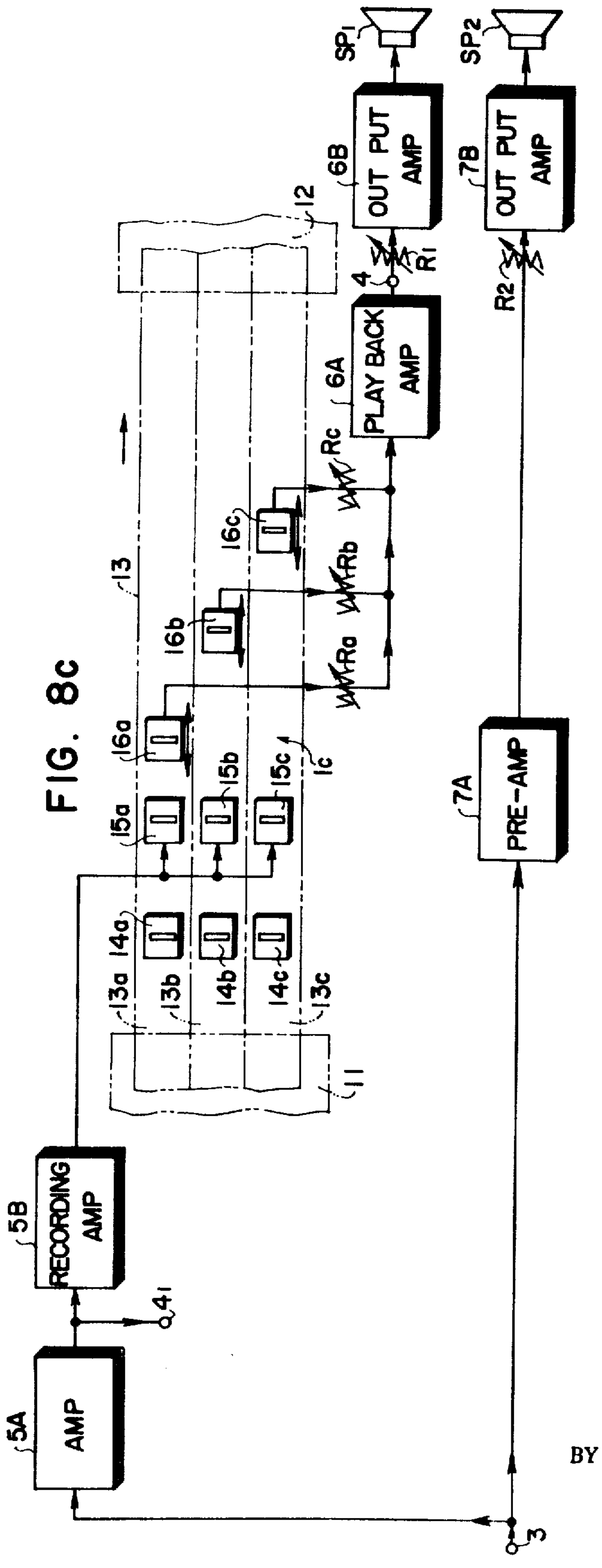

Referring to FIG. 6, there is shown an embodiment of the present apparatus, in which a plurality of recording heads and reproducing heads and erasing heads are disposed along a plurality of recording tracks established on a recording medium such as a magnetic tape, so that the recording heads and the reproducing heads may be movably displaced in the direction along the tape transportation as well as the tape may be instantaneously displaced.

Referring to FIGS. 7*a* to 7*d*, there are shown modifications of FIGS. 1, 4*a*, 6 and 5, respectively, in each of which there is provided a feedback circuit 7 or a mixing amplifier through a resistive attenuator between the output terminal 4 and the input terminal 3 for providing echo effects or tremolo effects in addition to vibrato effects. In FIGS. 8*a* through 8*d*, there are shown other modifications of FIGS. 1, 4*a*, 6 and 5, respectively, in each of which at the terminal 3 a preamplifier 7A is connected whose output is entered via a variable attenuator $R_2$ and an output amplifier 7B into a loudspeaker $SP_2$, while the output of the playback amplifier 6A is entered via another variable attenuator $R_1$ and an output amplifier 6B into another loudspeaker $SP_1$. Each of these arrangements provides mixing, in space, of sounds having the spectrum as shown in FIGS. 3*a* and 3*b*, resulting in audible sounds having a good build-up amplitude.

Next, reference is made to a drive means for use in the above-mentioned vibrato effect producing apparatus with reference to FIGS. 2*b* to 2*h*.

FIG. 2*b* is a circuit diagram substantially showing the details of the block diagram of FIG. 2*a*, in which blocks F, A and D correspond to reference numerals 23, 24 and 27, respectively; and symbols P, $R_{11}$, $R_{12}$, $L_1$,$L_2$ correspond to numerals 26, 22, 29, 25*a* and 25*b*.

FIG. 2*d* shows a structure of an electromagnetic piston-actuating means represented by a block including P, in which $Y_1$ and $Y_2$ are yokes by which plunger coils $L_1$ and $L_2$ are arranged opposite to each other, and $l_1$ and $l_2$ are guide tubes allowing a linear and reciprocal displacement of the piston. The piston is provided with a protruding movable piece $P_1$ on which may be mounted a position pick-up element such as a magnetic head.

In FIG. 2*e*, there is shown an example of the piston position detecting device D or 27, in which $m_1$ and $m_2$ are magnet pieces opposing each other with the reverse relation in polarity, between which there are arranged magneto-sensitive elements M*a* and M*b* — whose electrical resistances vary in accordance with the variation in the ambient magnetic field — to displace in response to the movement of the piston. As shown by block D in FIG. 2*b*, the elements M*a* and M*b* are connected in series, both of the other ends of which are connected to a zener diode ZD. When a predetermined voltage is supplied across the diode from a power source +Vcc, respective voltages across the elements M*a* and M*b* are varied in response to the displacement of the piston. The voltage variation thus obtained is amplified by a transistor $Q_1$ and then used as a control signal for the motion of the piston.

FIG. 2*f* shows a condition of current flowing into the plunger coils $L_1$ and $L_2$ in the circuit arrangement of FIG. 2b. Accordingly, coils $L_1$ and $L_2$ thus energized produce attractive forces as shown by solid curves in FIG. 2*g*. The dotted curves indicate the range in which fine adjustment may be made by varying the DC level at the base of transistor $Q_2$ of the comparator circuit F. FIG. 2*h* indicates the relation of impedance variation of the elements Ma and M*b* relative to the displacement of the piston.

FIG. 2*c* shows another circuit arrangement of the drive mechanism 2 — which is a modification of FIG. 2*b* — in which the plunger coils $L_1$ and $L_2$ are arranged to establish magnetic fields for actuating the piston P in the same direction or in the reverse direction.

I claim:

1. A vibrato effect producing apparatus comprising in combination means connected with a signal generator for receiving an input signal, at least one magnetic recording medium, a first drive means for transporting the recording medium at a predetermined speed, at least one recording head contactable with the medium for recording the input signal at said signal receiving means on the latter, a plurality of reproducing heads contactable with said recording medium capable of picking up the signal recorded on the medium, output means connected with the respective outputs of the reproducing heads for deriving the pickup signals individually, and second drive means for reciprocally displacing along the direction of movement of the recording medium said plurality of reproducing heads individually at different periods, phases or amplitudes with respect to each other at a low frequency in the movably contact relation with one another.

2. The apparatus according to claim 1, in which said recording heads and reproducing heads are paired.

3. The apparatus according to claim 1, which comprises a plurality of group units each consisting of said recording medium, said recording head and said reproducing head.

4. The apparatus according to claim 1, in which said recording medium is formed of a magnetic tape and is provided with a plurality of recording tracks thereon, each track having said corresponding recording and reproducing heads.

5. The apparatus according to claim 1, further comprising a feedback circuit connected between said input signal receiving means and said output means for feeding the pickup signals at the reproducing heads back to the input side.

6. The apparatus according to claim 1, further comprising a mixing circuit connected between said input receiving means and said output means for mixing said pickup signals and said input signal.

7. The apparatus according to claim 1, further comprising acoustic means connected respectively to said input receiving means and said output means for respectively converting said input signal and said pickup signal into acoustic sounds.

8. A vibrato effect producing apparatus comprising:
- means for receiving an input signal,
- a magnetic recording medium,
- a recording head connected to said input means for recording the input signal on said magnetic recording medium,
- a plurality of reproducing heads for reproducing the recorded signal from said recording medium,
- means for moving said magnetic recording medium past said recording and reproducing heads,
- drive means for reciprocatingly displacing said plurality of reproducing heads along the direction of movement of said recording medium at different periods, phases or amplitudes from each other, and
- means connected to said reproducing heads for deriving a frequency modulated signal therefrom.

9. A method for producing a vibrato effect comprising the steps of:
- moving a magnetic recording medium past at least a single recording head adapted for receiving an input signal and a plurality of reproducing heads,
- reciprocatingly displacing said plurality of reproducing heads along the direction of movement of said recording medium at different periods, phases or amplitudes from each other, and
- deriving a frequency modulated signal from said plurality of reproducing heads.

10. A method as in claim 9, including the further step of applying an input signal to said recording head.

* * * * *